(12) United States Patent
Kamamoto

(10) Patent No.: US 11,694,202 B2
(45) Date of Patent: Jul. 4, 2023

(54) TRANSACTION CERTIFICATION MANAGEMENT SYSTEM, TRANSACTION CERTIFICATION MANAGEMENT APPARATUS, AND TRANSACTION CERTIFICATION PROCESSING METHOD

(71) Applicant: TOSHIBA TEC KABUSHIKI KAISHA, Tokyo (JP)

(72) Inventor: Shunichiro Kamamoto, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 345 days.

(21) Appl. No.: 17/149,243

(22) Filed: Jan. 14, 2021

(65) Prior Publication Data
US 2021/0304203 A1 Sep. 30, 2021

(30) Foreign Application Priority Data
Mar. 24, 2020 (JP) .................................. 2020-053071

(51) Int. Cl.
G06Q 20/40 (2012.01)
G06F 21/60 (2013.01)
G06Q 20/32 (2012.01)
G06K 7/14 (2006.01)
G06K 19/06 (2006.01)
G06Q 20/38 (2012.01)

(52) U.S. Cl.
CPC ....... *G06Q 20/4014* (2013.01); *G06F 21/602* (2013.01); *G06K 7/1417* (2013.01); *G06K 19/06037* (2013.01); *G06Q 20/3276* (2013.01); *G06Q 20/38215* (2013.01); *G06Q 2220/00* (2013.01)

(58) Field of Classification Search
None
See application file for complete search history.

(56) References Cited

U.S. PATENT DOCUMENTS

| 2014/0188641 | A1* | 7/2014 | Argue | G06Q 30/012 |
| | | | | 705/16 |
| 2015/0026074 | A1* | 1/2015 | Cotten | G06Q 30/012 |
| | | | | 705/302 |
| 2017/0186017 | A1* | 6/2017 | High | G06Q 20/389 |

FOREIGN PATENT DOCUMENTS

JP 2005135309 A 5/2005

* cited by examiner

*Primary Examiner* — Kristy A Haupt
(74) *Attorney, Agent, or Firm* — Kim & Stewart LLP

(57) ABSTRACT

In general, according to one embodiment, a transaction certification system includes a transaction processing apparatus and a server. The transaction processing apparatus outputs encrypted data including transaction certification data for certification of a transaction executed on the transaction processing apparatus. The server receives the encrypted data from a first terminal apparatus that reads the encrypted data that has been output by the transaction processing apparatus. The server acquires a first user identifier identifying a user of the first terminal apparatus sending the encrypted data. The server stores the transaction certification data of the encrypted data in a storage device. The transaction certification data is stored in correlation with the acquired user identifier. The server receives a second user identifier from a user requesting a transaction certification, and then transmits the transaction certification data to a second terminal apparatus associated with the second user identifier.

20 Claims, 8 Drawing Sheets

TRANSACTION CERTIFICATION MANAGEMENT SYSTEM, TRANSACTION CERTIFICATION MANAGEMENT APPARATUS, AND TRANSACTION CERTIFICATION PROCESSING METHOD

CROSS-REFERENCE TO RELATED APPLICATION

This application is based upon and claims the benefit of priority from Japanese Patent Application No. 2020-053071, filed Mar. 24, 2020, the entire contents of which are incorporated herein by reference.

FIELD

Embodiments described herein relate generally to a transaction certification management system, a transaction certification management apparatus, and transaction certification processing method.

BACKGROUND

A transaction processing apparatus, such as a point-of-sale (POS) terminal, that dispenses a transaction certificate that is printed on paper when a commodity with a warranty or the like is sold is known. In this context, the printed transaction certificate includes, printed thereon, a purchase date and other transaction-related information for the commodity with the warranty. When such a transaction certificate is printed, generally text concerning detailed requirements or conditions related to the warranty is omitted. Therefore, when requesting or receiving a warranty covered service, the purchaser typically needs to present both the transaction certificate (as proof of purchase or the like) and a separate warranty document.

That is, the purchaser needs to keep the transaction certificate as well as the warranty document, which is troublesome. In particular, either one of a transaction certificate or a warranty document separately printed on a common-type receipt paper may be lost over time due to carelessness of a purchaser.

Thus, it would be desirable to reduce inconveniences associated with management of transaction certificates for a purchaser so that the certification of transaction details for transactions made in the past can be more conveniently provided.

DETAILED DESCRIPTION

Certain embodiments include a transaction certification system, a transaction certification management apparatus, and a transaction certification processing method capable of reducing the burden on a purchaser relating to the certification of transaction details for past transaction.

In general, according to one embodiment, a transaction certification system includes a transaction processing apparatus and a server. The transaction processing apparatus is configured to output encrypted data including transaction certification data for certification of a transaction executed on the transaction processing apparatus. The server is configured to: receive the encrypted data from a first terminal apparatus configured to read the encrypted data output by the transaction processing apparatus; acquire a first user identifier identifying a user of the first terminal apparatus sending the encrypted data; store the transaction certification data of the encrypted data in a storage device, the transaction certification data being stored correlated to the acquired user identifier; receive a second user identifier for a user requesting a transaction certification; and transmit the transaction certification data to a second terminal apparatus associated with the second user identifier.

Hereinafter, certain example embodiments will be described with reference to the drawings.

Figure 1:
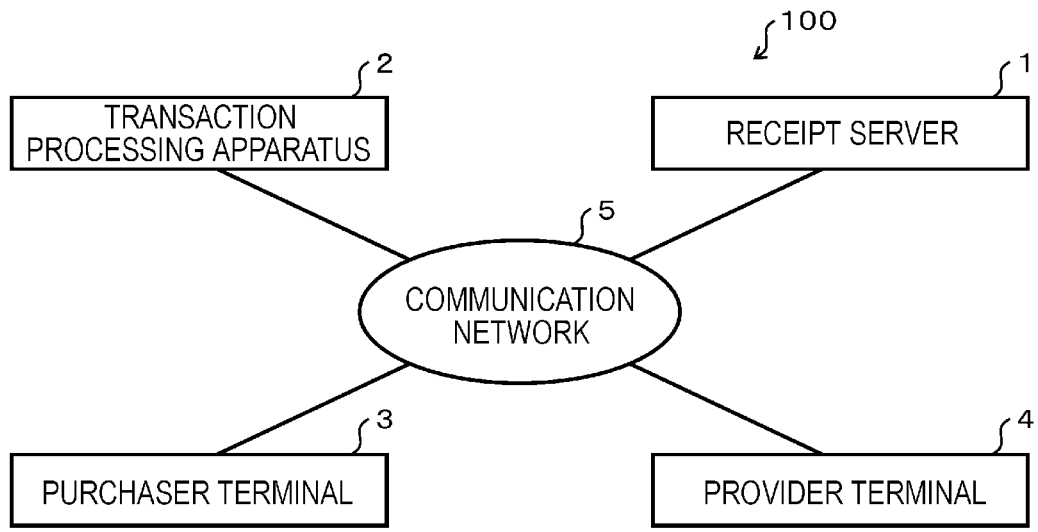
FIG. 1 depicts a schematic configuration of a transaction certification system according to an embodiment.

FIG. 1 is a block diagram illustrating a schematic configuration of a transaction certification system according to an embodiment.

A transaction certification system 100 according to the embodiment is configured such that a receipt server 1 can communicate with each of a transaction processing apparatus 2, a purchaser terminal 3, and a provider terminal 4 via a communication network 5. The drawing illustrates a single transaction processing apparatus 2, a single purchaser terminal 3, and a single provider terminal 4. However, the transaction certification system 100 may include a plurality of transaction processing apparatuses 2, a plurality of purchaser terminals 3, and a plurality of provider terminals 4.

The receipt server 1 has a basic function of managing electronic receipt data that represents details of transactions processed by the transaction processing apparatus 2 and providing an electronic receipt service. The receipt server 1 has an additional function of providing a transaction certification service as described below. Thus, the receipt server 1 is an example of the management apparatus that manages the transaction certification service. The receipt server 1 is operated by, for example, a supplier of an electronic receipt service.

The transaction processing apparatus 2 performs information processing for registering the content of transactions in a shop or the like and settling a price therefor. The transaction to be processed by the transaction processing apparatus 2 includes sales of a commodity with a warranty ("a warranted commodity"). The transaction processing apparatus 2 is operated by, for example, a retail seller.

The purchaser terminal 3 and the provider terminal 4 are terminal apparatuses that are operated by users of the transaction certification service provided by the receipt server 1. The user who operates the purchaser terminal 3 is a purchaser of the commodity items in the transaction to be certified. The user who operates the provider terminal 4 is an employee of a provider who repairs, services, or the like a commodity in the certified transaction.

Thus, the receipt server 1, the transaction processing apparatus 2, the purchaser terminal 3, and the provider terminal 4 are each operated by different operators in this example.

As the communication network 5, the Internet, a virtual private network (VPN), a local area network (LAN), a public communication network, a mobile communication network (e.g., a cellphone network), and the like can be used singly or can be used appropriately in combination. As the communication network 5 in this example, the Internet and a mobile communication network are used in combination.

Figure 2:
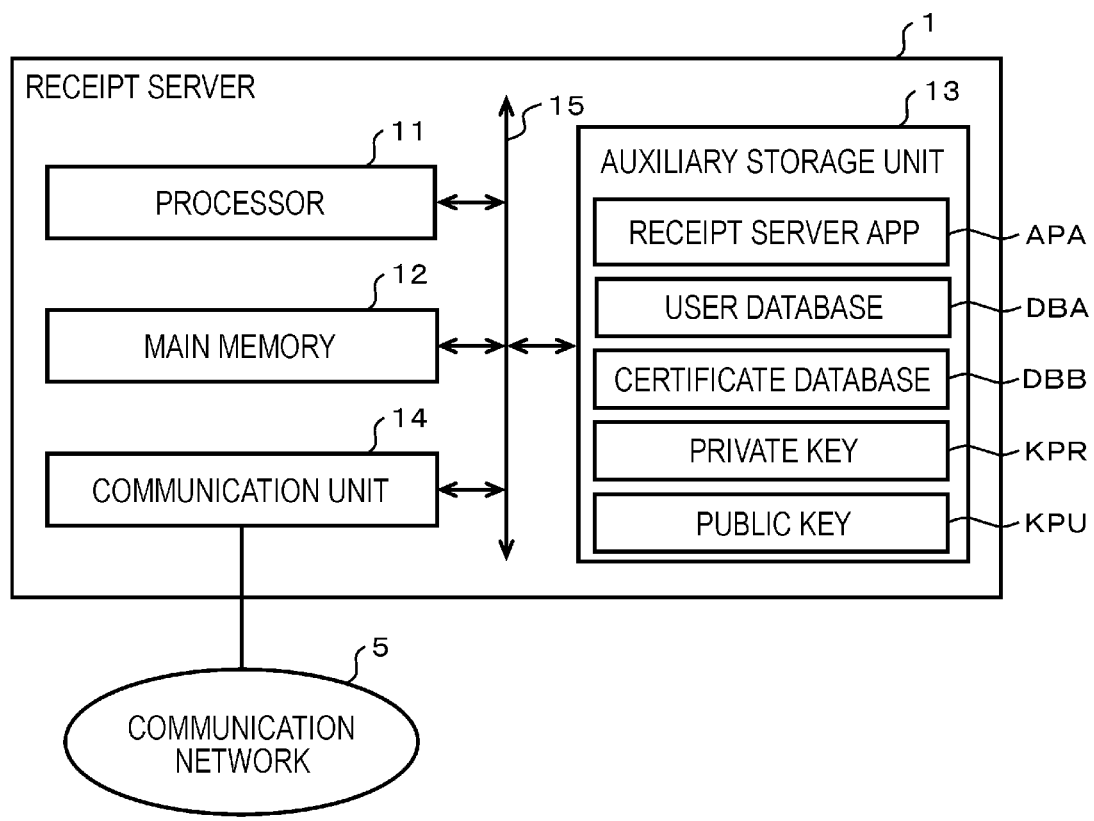
FIG. 2 is a block diagram illustrating aspects of a receipt server.

FIG. 2 is a block diagram illustrating a configuration of the receipt server 1.

The receipt server 1 includes a processor 11, a main memory 12, an auxiliary storage unit 13, a communication unit 14, and a transmission line 15. The processor 11, the main memory 12, the auxiliary storage unit 13, and the communication unit 14 are connected through the transmission line 15.

The processor 11 can be a central processing unit (CPU). The processor 11 executes information processing for implementing various functions of the receipt server 1 in accordance with information processing software such as an operating system, middleware, and an application program.

The main memory 12 includes a non-volatile memory area and a volatile memory area. The main memory 12 stores the above-described information processing program in the non-volatile memory area. In addition, the main memory 12 may store data required for the processor 11 to execute processing for controlling the respective units in the non-volatile or volatile memory area. The main memory 12 may use the volatile memory area as a work area where data is appropriately rewritten by the processor 11.

As the auxiliary storage unit 13, for example, an electric erasable programmable read-only memory (EEPROM), a hard disc drive (HDD), a solid-state drive (SSD), or other storage devices can be used. The auxiliary storage unit 13 stores data used by the processor 11 to execute various processes and data generated by a process of the processor 11. The auxiliary storage unit 13 may also store an information processing program.

The communication unit 14 executes data communication via the communication network 5. As the communication unit 14, in general, any device that is configured to execute processes for data communication via the Internet can be used.

The transmission line 15 includes an address bus, a data bus, and a control signal line, and transmits data or a control signal that is transmitted and received between the respective parts connected to each other.

The auxiliary storage unit 13 stores a receipt server app APA. The receipt server app APA is an application program, in which a service provision process for providing the electronic receipt service and the transaction certification service is described. The receipt server app APA may be stored in the main memory 12. In addition, the receipt server app APA may be stored in another storage device that is separately provided to store the information processing program.

A part of the storage area of the auxiliary storage unit 13 is used as a user database DBA and a certification database DBB. The user database DBA is for managing the users of both the electronic receipt service and the transaction certification service that are provided by the receipt server 1. The certification database DBB is for managing certification data for purchase certification.

The auxiliary storage unit 13 stores a pair of a private key KPR and a public key KPU for encryption and decryption.

Figure 3:
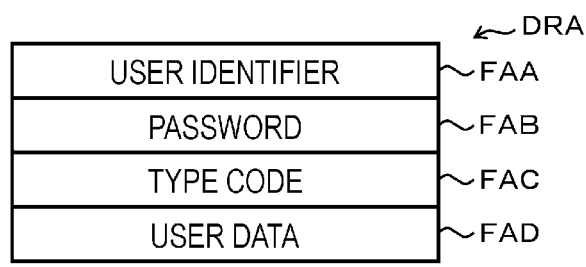
FIG. 3 schematically illustrates a configuration of a data record in a user database.

FIG. 3 is a diagram schematically illustrating a configuration of a data record DRA in the user database DBA.

The user database DBA is a set of data records DRA correlating with respective users. The data record DRA includes fields FAA, FAB, FAC, and FAD. In the field FAA, a user identifier for identifying a user correlating to the data record DRA is stored. In the field FAB, a password for authenticating the user is stored. In the field FAC, a type code indicating a type of the user is stored. The type code permits it to be determined whether the user is a purchaser or a repair provider. In the field FAD, user data including various pieces of data such as a name relating to the user is stored.

The data record DRA may include a field or fields in which any data other than the above-described data can be stored. Alternatively, the data record DRA omit some of the described fields such as, for example, the field FAD.

Figure 4:
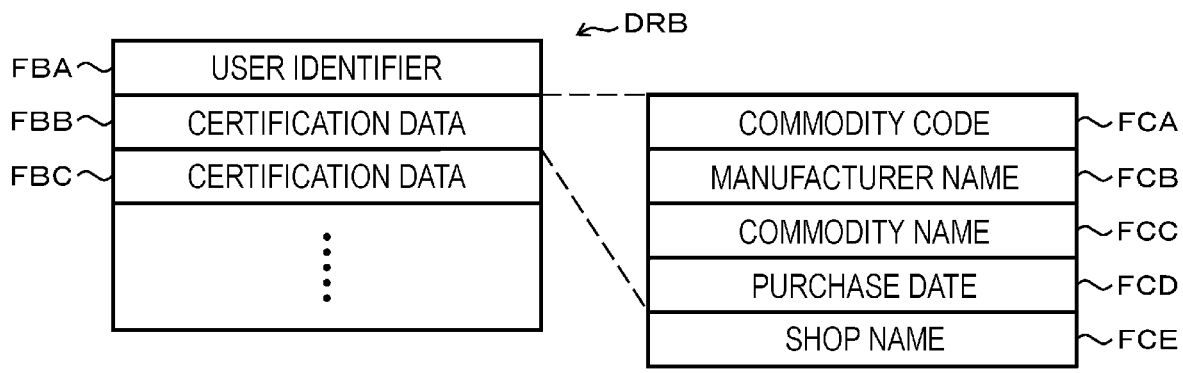
FIG. 4 illustrates a configuration of a data record in a certificate database.

FIG. 4 is a diagram schematically illustrating a configuration of a data record DRB in the certificate database DBB.

The certificate database DBB is a set of data records DRB correlated to each of the respective users. The depicted data record DRB includes fields FBA, FBB, and FBC. The data record DRB may include one or more fields after the field FBC. In the field FBA, a user identifier for identifying a user associated with the data record DRB is stored. In fields (e.g., FBB, FBC . . . ) after the field FBA, certification data is stored. Each of these fields FBB, FBC, . . . can be referred to as a certification data group. Each certification data group is correlated to a commodity that has been purchased by a user associated with the data record DRB. The stored certification data is for certifying transaction of the relevant commodity. The certification data group includes at least the information required for certifying that the commodity associated with the certification data group is under warranty.

In the embodiment, each certification data group includes fields FCA, FCB, FCC, FCD, and FCE. In the field FCA, a commodity code for identifying the commodity associated with the certification data group is stored. The commodity code is typically a Japanese article number (JAN) code. In the field FCB, a name of a manufacturer of the commodity associated with the certification data group is stored. In the field FCC, a commodity name for the commodity associated with the certification data group is stored. In the field FCD, a purchase date for the commodity associated with the certification data group is stored. In the field FCE, a name of a shop where the commodity associated with the certification data group was purchased is stored. In general, the certification data groups may include a field for any data deemed appropriate or potentially useful, such as a model number of the commodity or the total number of the commodities in the transaction. In addition, the certification data group need not include all of the depicted fields, for example, the field FCE can be omitted.

The receipt server 1 can be implemented using a receipt server app APA stored in the auxiliary storage unit 13. The receipt server app APA may be stored (pre-loaded) in the auxiliary storage unit 13 at the time of initial transfer of the receipt server 1, or may be transferred separately. In the latter case, the receipt server app APA can be recorded in a removable recording medium such as a magnetic disk, a magneto-optic disk, an optical disk, and a semiconductor memory, or transferred via a network.

Figure 5:
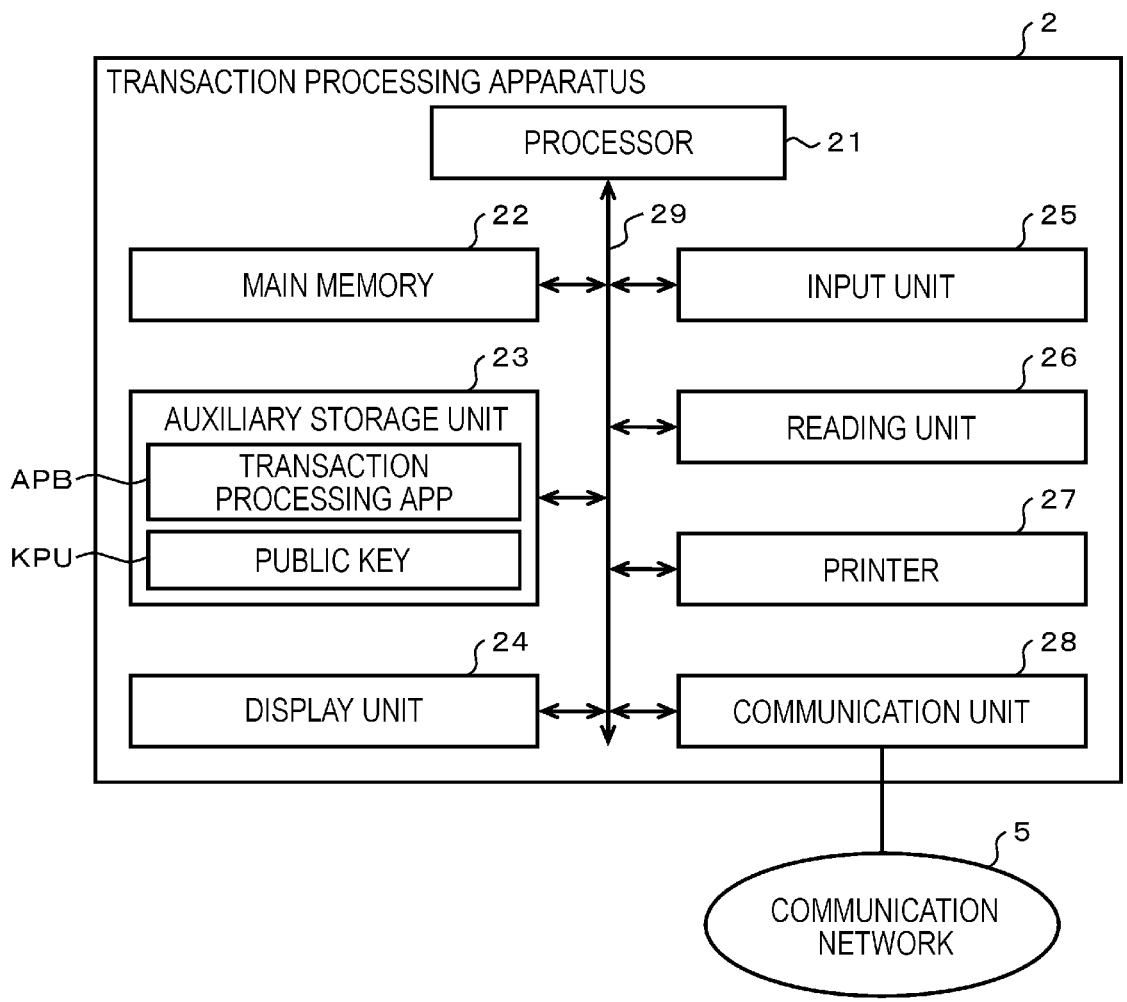
FIG. 5 is a block diagram illustrating a configuration of a transaction processing apparatus.

FIG. 5 is a block diagram illustrating a configuration of the transaction processing apparatus 2.

The transaction processing apparatus 2 includes a processor 21, a main memory 22, an auxiliary storage unit 23, a display unit 24, an input unit 25, a reading unit 26, a printer 27, a communication unit 28, and a transmission line 29. The processor 21, the main memory 22, the auxiliary storage unit 23, the display unit 24, the input unit 25, the reading unit 26, the printer 27, and the communication unit 28 are connected through the transmission line 29. The basic functions of the processor 21, the main memory 22, the auxiliary storage unit 23, the communication unit 28, and the transmission line 29 are substantially similar to those of the corresponding components, the processor 11, the main memory 12, the auxiliary storage unit 13, the communication unit 14, and the transmission line 15 of the receipt server 1.

The auxiliary storage unit 23 stores a transaction processing app APB. The transaction processing app APB is an application program by which the following information processing for processing the sales of a commodity (hereinafter, referred to as a transaction processing) in a shop is provided. The transaction processing app APB may be stored in the main memory 22. In addition, the transaction processing app APB may be stored in another storage device that is separately provided to store the information processing program.

In addition, the auxiliary storage unit 23 stores the same public key KPU as that stored in the auxiliary storage unit 13, but does not store the private key KPR. The public key KPU can be set by a supplier of the transaction certification service and can be open to an operator of the transaction processing apparatus 2.

The display unit 24 displays various screens for notifying various pieces of information to the operator. As the display unit 24, for example, a display device such as a liquid crystal display device can be applied.

The input unit 25 inputs various instructions from the operator. As the input unit 25, input devices such as a touch sensor or a keyboard can be applied alone or in combination.

As the reading unit 26, reading devices such as a barcode scanner, a card reader, or a wireless tag reader can be utilized alone or in combination.

The printer 27 prints various images on a receipt sheet.

As hardware of the transaction processing apparatus 2, for example, an existing POS terminal can be used. The transaction processing app APB may be stored in the auxiliary storage unit 23 at time of the initial transfer (e.g., sale) of the transaction processing apparatus 2 or may be transferred separately from the hardware. In the latter case, the transaction processing app APB can be recorded in a removable recording medium such as a magnetic disk, a magneto-optic disk, an optical disk, and a semiconductor memory, or transferred via a network. Similarly, a revised or updated transaction processing app APB (or portions thereof) can be provided subsequent to the initial transfer.

Figure 6:
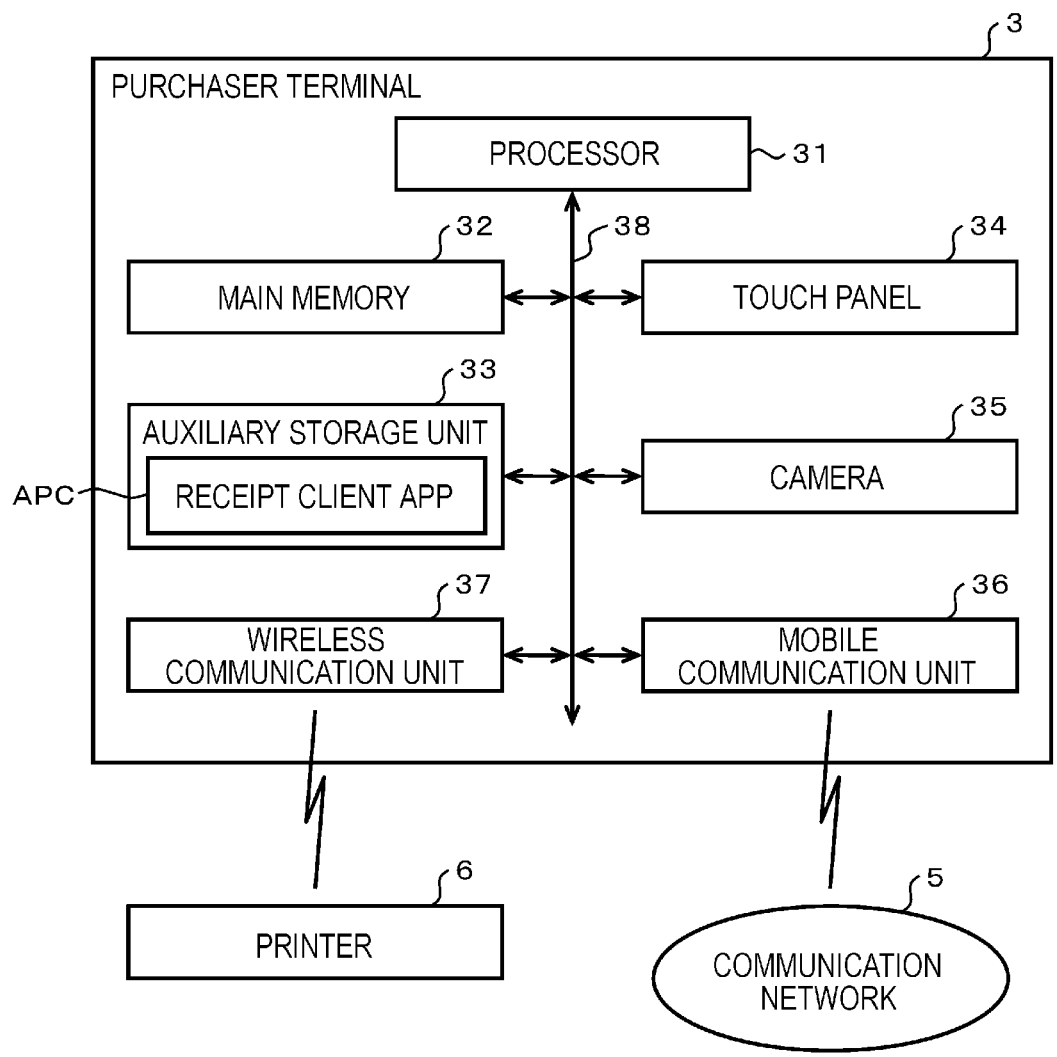
FIG. 6 is a block diagram illustrating aspects of a purchaser terminal.

FIG. 6 is a block diagram illustrating a configuration of purchaser terminal 3.

The purchaser terminal 3 includes a processor 31, a main memory 32, an auxiliary storage unit 33, a touch panel 34, a camera 35, a mobile communication unit 36, a wireless communication unit 37, and a transmission line 38. The processor 31, the main memory 32, the auxiliary storage unit 33, the touch panel 34, the camera 35, and the mobile communication unit 36 can communicate with each other through the transmission line 38. By connecting the processor 31, the main memory 32, and the auxiliary storage unit 33 through the transmission line 38, a computer for controlling the purchaser terminal 3 is configured. The basic functions of the processor 31, the main memory 32, the auxiliary storage unit 33, and the transmission line 38 are substantially similar to corresponding components, the processor 11, the main memory 12, the auxiliary storage unit 13, and the transmission line 15, of the receipt server 1.

The auxiliary storage unit 33 stores a receipt client app APC instead of the receipt server app APA. The receipt client app APC is an application program causing the purchaser terminal 3 to function as a terminal apparatus for using the electronic receipt service and the transaction certification service. The receipt client app APC may be stored in the main memory 22. In addition, the receipt client app APC may be stored in another storage device that is separately provided to store the information processing program.

The touch panel 34 functions as an input device and a display device of the purchaser terminal 3.

The camera 35 includes an optical system and an image sensor and generates, by the image sensor, image data representing an image which is in a field of view and is formed by the optical system.

The mobile communication unit 36 is an interface for data communication via the communication network 5. As the mobile communication unit 36, any known communication device for communication via a mobile communication network can be used.

The wireless communication unit 37 transmits and receives data to and from a printer 6 through wireless communication in accordance with a wireless communication protocol. As the wireless communication unit 37, for example, a communication device based on an IEEE 802.11 standard or Bluetooth® can be used. The printer 6 prints an image in response to a print instruction received through wireless communication. As the printer 6, a general-purpose home printer including such a connectivity function can be used. For communication between the purchaser terminal 3 and the printer 6, wired communication such as a universal serial bus (USB) communication through a cable may be applied in some examples.

As hardware of the purchaser terminal 3, for example, a communication terminal having a data communication function, such as a smartphone or a tablet terminal belonging to the purchaser, can be used. Typically, the receipt client app APC is downloaded via a network and installed on the purchaser terminal 3. However, the receipt client app APC may be recorded in a removable recording medium such as a magnetic disk, a magneto-optic disk, an optical disk, and a semiconductor memory, or transferred via a network. Alternatively, the receipt client app APC may be stored in the auxiliary storage unit 33 when the purchaser terminal 3 is initially sold.

Figure 7:
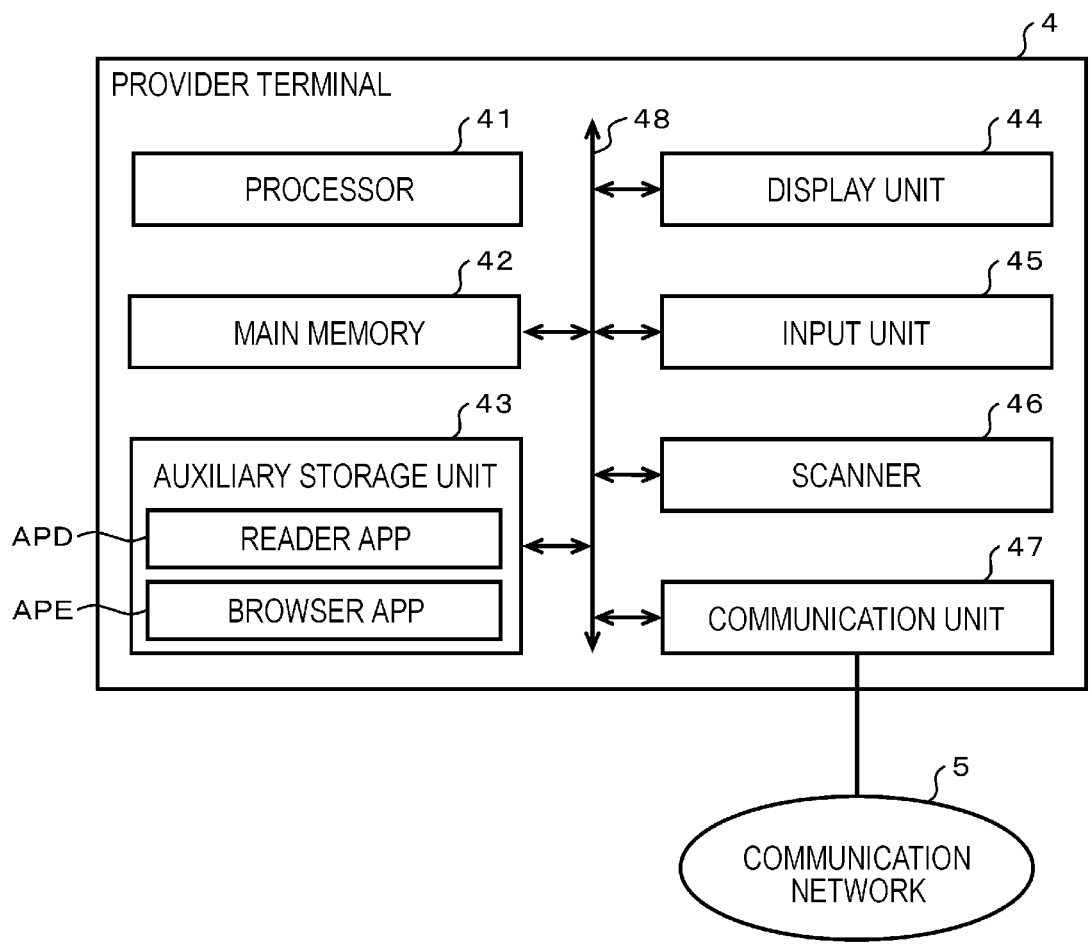
FIG. 7 is a block diagram illustrating aspects of a provider terminal.

FIG. 7 is a block diagram illustrating a configuration of a provider terminal 4.

The provider terminal 4 includes a processor 41, a main memory 42, an auxiliary storage unit 43, a display unit 44, an input unit 45, a scanner 46, a communication unit 47, and a transmission line 48. The processor 41, the main memory 42, the auxiliary storage unit 43, the display unit 44, the input unit 45, the scanner 46, and the communication unit 47 can communicate with each other through the transmission line 48. By connecting the processor 41, the main memory 42, and the auxiliary storage unit 43 through the transmission line 48, a computer for controlling the provider terminal 4 is configured. In general, the basic functions of the processor 41, the main memory 42, the auxiliary storage unit 43, the communication unit 47, and the transmission line 48 are substantially similar to those of the corresponding components, processor 11, the main memory 12, the auxiliary storage unit 13, the communication unit 14, and the transmission line 15, of the receipt server 1.

The auxiliary storage unit 43 stores a reader app APD and a browser app APE instead of the receipt server app APA. The reader app APD is an application program by which information processing for reading data represented by a two-dimensional code is provided. The browser app APE provides information processing for implementing a browser function for web access via the communication network 5. As the reader app APD and the browser app APE, existing application programs providing the described functions can be used in some examples. The reader app APD and the browser app APE may be stored in the main memory 42. In addition, the reader app APD and the browser app APE may be stored in another storage device that is separately provided.

The display unit 44 displays various screens of information to the operator. As the display unit 44, for example, a display device such as a liquid crystal display device can be utilized.

The input unit 45 permits input of various instructions from the operator. As an input unit 45, input devices such as a touch sensor, a keyboard, or a mouse can be utilized singly or in combination with each other.

The scanner 46 optically reads an optically readable code such as a two-dimensional code.

As hardware of the provider terminal 4, a general-purpose computer apparatus having a communication function via the communication network 5 can be used. The reader app APD and the browser app APE may be application programs that commonly come pre-installed on computers such as a provider terminal 4, or these application programs may be separately downloaded via, for example, the communication network 5 and then installed on the provider terminal 4.

As a provider terminal 4, a portable information communication apparatus such as a smartphone or a tablet computer may be used. In this case, the provider terminal 4 comes equipped with a touch panel screen to function as a display unit 44 and an input unit 45 and includes a camera to function as a scanner 46. In this case, the provider terminal 4 may include a communication unit similar to the mobile communication unit 36 or the wireless communication unit 37, as the communication unit 47.

Next, an operation of the transaction certification system 100 will be described. The details of the various processes described below are merely examples and changes in the order of a part of the processes, omission of a part of the processes, or addition of other processes can be appropriately made. In general, in the following description, for ease of understanding the characteristic operations of the embodiment will be described, and some common operations which may be a part of the processes will not be particularly described. For example, when errors occur, certain processes for dealing with the error may be executed, but these parts of the processing will not be described in detail.

In the transaction certification system 100, the receipt server 1 provides the transaction certification service as an additional service of the electronic receipt service. Other than characteristic operations of the transaction certification system 100 relating to provision of the transaction certification service, the functions and the operations of the electronic receipt service may be the same as those of existing services.

Figure 8:
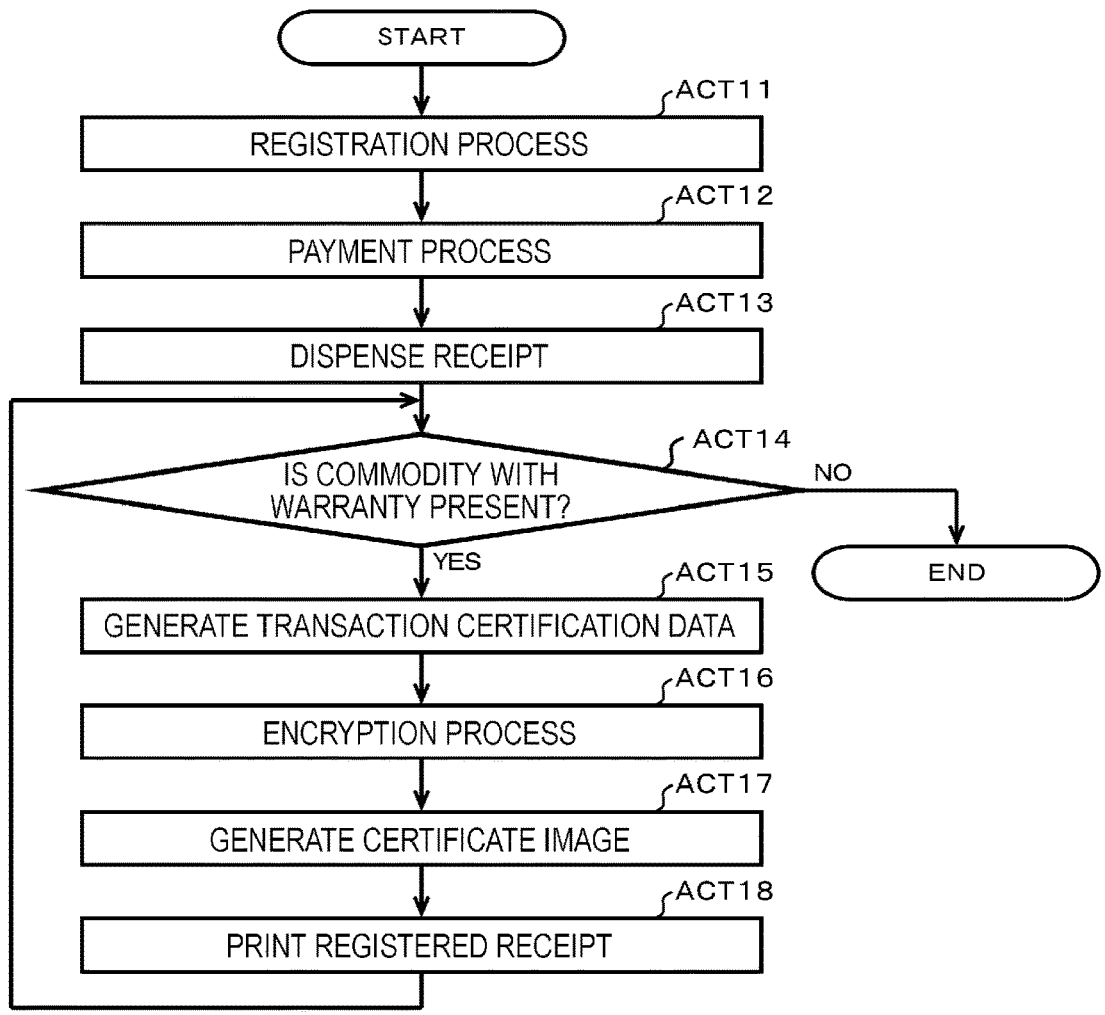
FIG. 8 is a flowchart illustrating aspects of a transaction process.

FIG. 8 is a flowchart illustrating the transaction process.

Once a predetermined start operation is executed by, for example, the input unit 25, the processor 21 in the transaction processing apparatus 2 starts the transaction process based on the transaction processing app APB.

In ACT 11, the processor 21 executes a registration process. Specifically, the processor 21 registers a commodity code based on information acquired by the reading unit 26 or a commodity code based on an operation of the input unit 25. In order to add the commodity identified by the commodity code to a commodity list for a transaction, the processor 21 updates information in a commodity list area in the main memory 22 or the auxiliary storage unit 23. At this time, the processor 21 may calculate the latest subtotal by adding the unit price of the newly registered commodity to a previously calculated subtotal.

In ACT 12, the processor 21 executes a payment process. Specifically, the processor 21 calculates a settlement amount for all the registered commodities. The processor 11 then handles settlement (payment) operations for the calculated settlement amount.

In ACT 13, the processor 21 causes a receipt reflecting various transaction details to be dispensed. Specifically, the processor 21 generates a receipt image that represents text or the like representing the content of the transaction based on the commodity list and the result of the payment process. The processor 21 causes the receipt image to include, for example, a shop code, a shop name, date and time, a register number, a clerk code, a clerk name, a user code, a manufacturer name, a commodity code, a commodity name, a unit price, a subtotal, a tax, a total amount, a deposit amount, a change amount, a transaction score, and a receipt number. The processor 21 transmits the receipt image to the print 27 and instructs the printer 27 to print the receipt image. The kind of the information and the arrangement thereof are optional, and can be appropriately determined by a designer or the like of the transaction processing apparatus 2. The printer 27 prints the receipt image on the receipt sheet in response to the instruction. The printer 27 discharges the receipt sheet on which the receipt image is printed, that is, a receipt. As a result, the dispensing of the receipt is completed. The processor 21 may generate electronic receipt data including various pieces of information representing the receipt image and may request the receipt server 1 to store the electronic receipt data in a state where the electronic receipt data correlates with the user identifier of the purchaser.

In ACT 14, the processor 21 checks whether a warranted commodity is included in purchased commodities. When a warranted commodity is included in the purchased commodities, the processor 21 determines YES, sets the particular commodity as a target, and executes ACT 15 and subsequent processes. For example, the processor 21 checks whether or not a particular commodity is warranted by referring to a warranty flag in a commodity master database.

In ACT 15, the processor 21 generates certification data. For example, the processor 21 extracts the various pieces of information to be included in the certification data from the information represented by the receipt image and then generates the certification data including the extracted pieces of information.

In ACT 16, the processor 21 executes an encryption process. Specifically, the processor 21 encrypts the certification data generated as described above using the public key KPU stored in the auxiliary storage unit 23. The specific information processing for encryption may be based on any conventional encryption protocol process.

In ACT 17, the processor 21 generates a certificate image.

In ACT 18, the processor 21 transmits the certificate image to the printer 27 and instructs the printer 27 to print the certificate image. The printer 27 prints the certificate image on the receipt sheet in response to the instruction. The printer 27 discharges the receipt sheet on which the certificate image is printed, that is, a transaction certificate.

Figure 9:
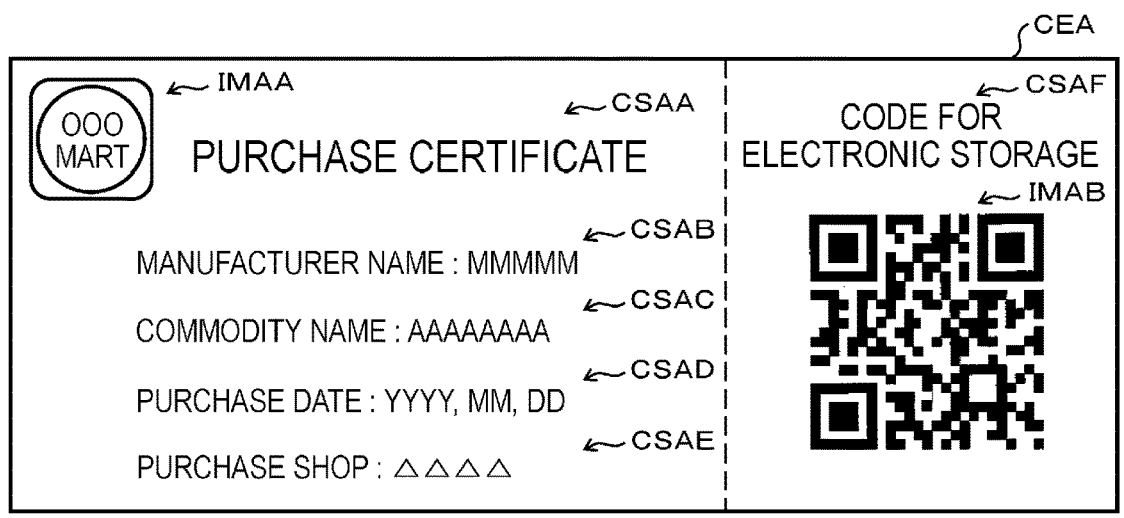
FIG. 9 depicts an example of a transaction certificate according to an embodiment.

FIG. 9 is a diagram illustrating an example of the transaction certificate.

The transaction certificate CEA illustrated in FIG. 9 includes images IMAA and IMAB and character strings CSAA, CSAB, CSAC, CSAD, CSAE, and CSAF.

The image IMAA is a logo of a shop. The image IMAB is a two-dimensional code representing encrypted data obtained by encrypting the certification data. The processor 21 generates the image IMAA obtained by converting the encrypted data, which is obtained in the encryption process of ACT 16, into a two-dimensional code based on a predetermined protocol. The character string CSAA indicates that the receipt is a certificate relating to the sales transaction of a commodity corresponding to the contents represented by the character strings CSAB, CSAC, CSAD, and CSAE. In the example illustrated in FIG. 9, the certificate is used to certify the commodity purchase by the purchaser occurred, and thus in the character string CSAA, "purchase certificate" is written. The character string CSAB represents a name of the manufacturer of the target commodity. The character string CSAC represents a commodity name of the target commodity. The character string CSAD represents a transaction date. The character string CSAE represents a name of the shop where the transaction was executed. The character string CSAF indicates that the image IMAB is a code for electronic storage of the content of the transaction certificate CEA.

Next, the processor 21 returns to ACT 14. When the processor 21 executes ACT 14 secondly or subsequently, the processor 21 checks whether or not a commodity with a warranty that is not yet processed as the target commodity is present while repeating the loop from ACT 14 to ACT 18. When the corresponding commodity is present, the processor 21 executes ACT 15 to ACT 18 by using this commodity as the target commodity. When the corresponding commodity is not present, the processor 21 determines NO in ACT 14 and ends the transaction process.

The purchaser may keep the transaction certificate CEA as it is together with the warranty. However, when the transaction certificate CEA is electronically stored, the purchaser instructs the purchaser terminal 3 to start information processing based on the receipt client app APC. The purchaser who uses the transaction certification service provided by the receipt server 1 executes user registration for the electronic receipt service, acquires a user identifier from the electronic receipt service, and sets a password for authentication purposes. The user identifier and the password are managed by the user database DBA.

The processor 31 starts information processing based on the receipt client app APC. The processor 31 requests the receipt server 1 to authenticate the user. For example, the processor 31 transmits request data, which includes identification data for identifying the user authentication request and the user identifier and the password, from the mobile communication unit 36 to the receipt server 1 via the communication network 5. The processor 31 may cause the request data to include the user identifier and the password stored in the main memory 32 or the auxiliary storage unit 33 in advance, or may receive some other designation of a user identifier and a password by the purchaser (for example, user input).

When the request data is transmitted to the receipt server 1 via the communication network 5 and then received by the communication unit 14, the processor 11 starts the service provision process based on the receipt server app APA.

Figure 10:
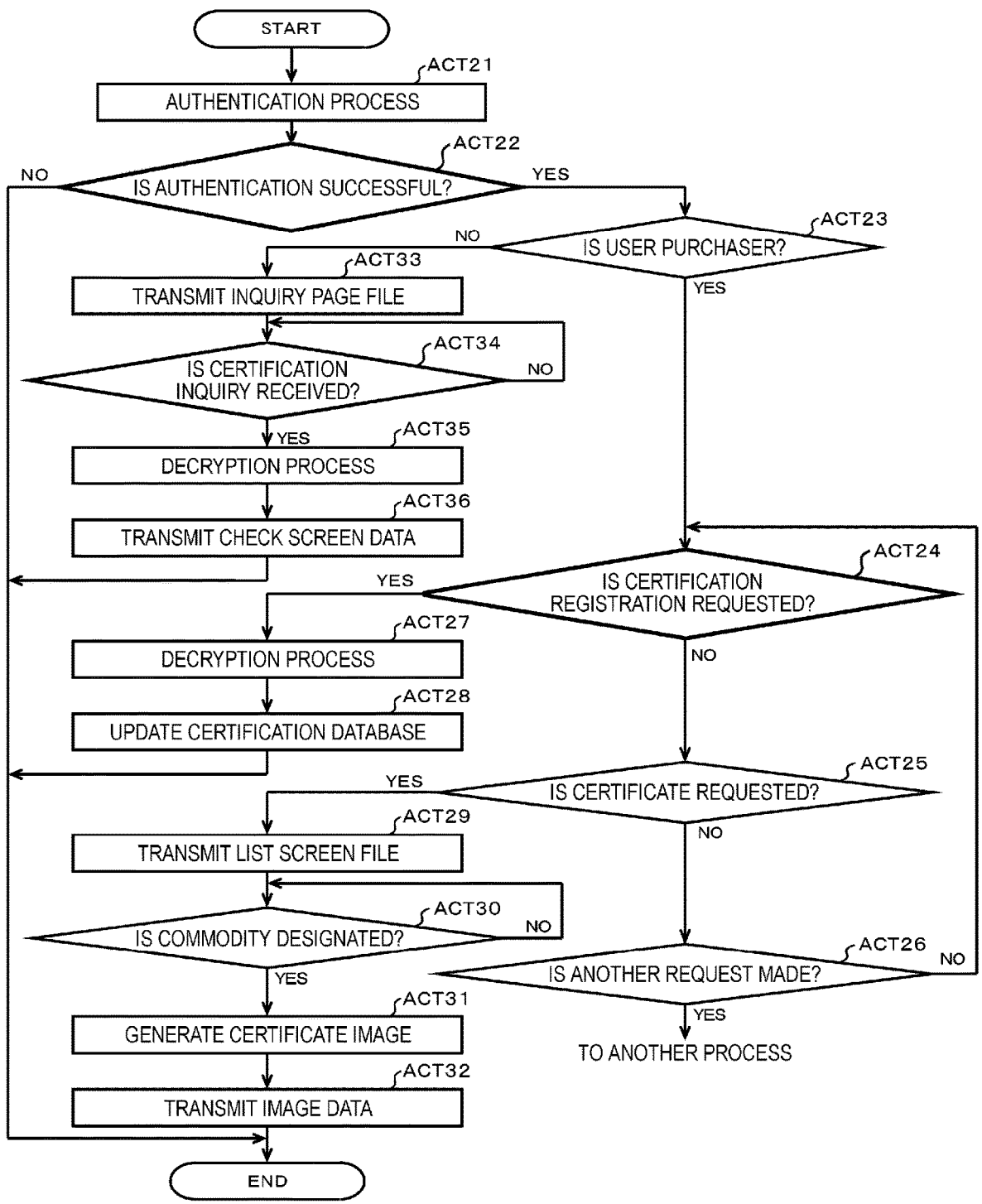
FIG. 10 is a flowchart illustrating aspects of a service provision process.

FIG. 10 is a flowchart illustrating the service provision process.

In ACT 21, the processor 11 executes an authentication process. For example, the processor 11 searches the user database DBA for the data record DRA with the combination of the user identifier and the password in the fields FAA and FAB matching the request data.

In ACT 22, the processor 11 checks whether or not the authentication is successful. For example, when the corresponding data record DRA is not found, the processor 11 determines NO and ends the service provision process. In this case, the processor 11 may send an authentication error notification to the purchaser terminal 3 that sent the authentication request. For the authentication process for the user, any process for authenticating the user via the communication network 5 can also be applied.

If the corresponding data record DRA is found, the processor 11 determines YES in ACT 22 and proceeds to ACT 23. In this case, the processor 11 sends an authentication success notification to the purchaser terminal 3.

In ACT 23, the processor 11 checks whether or not the authenticated user is a purchaser. The user of the transaction certification service may also be an employee of the repair provider that executes repairs and the like on the warranted commodity. Here, in this example, the processor 11 checks whether or not the authenticated user is a purchaser rather than an employee of the repair provider. For example, when the type code in the field FAC of the data record DRA found in ACT 21 is the code indicating a purchaser, the processor 11 determines YES and proceeds to ACT 24.

In ACT 24, the processor 11 checks whether or not the transaction certification registration is requested. When the request is made, the processor 11 determines NO and proceeds to ACT 25.

In ACT 25, the processor 11 checks whether or not a certificate is requested. When the request is not made, the processor 11 determines NO and proceeds to ACT 26.

In ACT 26, the processor 11 checks whether or not another request type is made. When such a request is not made, the processor 11 determines NO and returns to ACT 24.

In ACT 24 to ACT 26, the processor 11 waits for a request. When a request other than either a request for transaction certification registration or a request for a certificate is made, the processor 11 determines YES in ACT 26 and proceeds to a process to implement a function corresponding to the request. For example, a process for causing the purchaser terminal 3 to display a screen showing the details relating to a previous transaction is an example of a process in this case.

The purchaser who wants electronic storage of the transaction certificate CEA instructs the purchaser terminal 3 to start certification registration and then holds the two-dimensional code (represented as the image IMAB in the transaction certificate CEA) to be captured by the camera 35.

In the purchaser terminal 3, the processor 31 activates the camera 35 when the start of the certification registration is instructed. The processor 31 analyzes the image obtained by the camera 35 and tries to read the two-dimensional code. The reading of the two-dimensional code may be executed as a process based on the receipt client app APC or may be executed as a process based on another application program for reading the two-dimensional code. Once the two-dimensional code is read, the processor 31 requests the receipt server 1 to register the transaction certification. For example, the processor 31 transmits request data, which includes identification data for identifying the transaction certification registration request and the data represented by the two-dimensional code, from the mobile communication unit 36 to the receipt server 1 via the communication network 5.

In the transaction processing apparatus 2, the processor 21 may cause the two-dimensional code represented by the image IMAB to include identification data for identifying a two-dimensional code for registering transaction certification in addition to the encrypted data.

In the purchaser terminal 3, the processor 31 may determine that the two-dimensional code can be read only when the corresponding identification data is included in the read two-dimensional code. Alternatively, when the two-dimensional code is read, the processor 31 may determine that the two-dimensional code can be read irrespective of whether or not the two-dimensional code is the two-dimensional code for registering transaction certification.

In the purchaser terminal 3, the encrypted data is read by reading the two-dimensional code represented by the image IMAB. That is, the dispensing of the transaction certificate CEA including the image IMAB indicates that the encrypted data can be output such that the encrypted data is readable by the purchaser terminal 3. Thus, by the processor 11 executing information processing based on the receipt server app APA, a computer including the processor 11 functions as an output unit.

When the request data is transmitted to the receipt server 1 via the communication network 5 and then received by the communication unit 14, the processor 11 in the receipt server 1 determines YES in ACT 24 and proceeds to ACT 27. At this time, the processor 11 causes the main memory 12 or the auxiliary storage unit 13 to store the request data. Thus, by the processor 11 executing the information processing based on the receipt server app APA, a computer including the processor 11 acquires the encrypted data from the purchaser terminal 3.

In ACT 27, the processor 11 executes a decryption process. For example, the processor 11 tries to decrypt encrypted data found in the request data using the private key KPR. If the decryption is completed, the processor 11 proceeds to ACT 28. When the request data includes the encrypted data but the encrypted data cannot be decrypted using the private key KPR (because the encrypted data is not encrypted by the corresponding public key KPU), or when the request data does not include any encrypted data, the processor 11 simply ends the service provision process without proceeding to ACT 28. In this case, the processor 11 may notify the purchaser terminal 3 that the service provision process has ended because the correct two-dimensional code can not be read. Alternatively, the processor 11 may return to the waiting state in ACT 24 to ACT 26 after notifying the purchaser terminal 3 to attempt to read the two-dimensional code again.

In ACT 28, the processor 11 updates the certificate database DBB. For example, the processor 11 searches the certificate database DBB for the data record DRB with the user identifier of the user authenticated in ACT 21 stored in the field FBA. If a corresponding data record DRB is not present, a new data record DRB in which the user identifier is stored in the field FBA and the certification data group is stored in the field FBB can be added to the certificate database DBB.

If the corresponding data record DRB is found, the processor 11 adds a new field in which the new certification data is stored at the end of the data record DRB (e.g., after field FBC). The processor 11 stores a commodity code, a manufacturer name, a commodity name, a purchase date, and a shop name, each of which are obtained by the decryption in ACT 27, into the respective fields FCA to FCE of the certification data of the data record DRB. The processor 11 ends the service provision process after updating the certificate database DBB. At this time, the processor 11 may notify the purchaser terminal 3 of the completion of the registration.

In this way, the processor 11 stores the certification data (obtained by decrypting the encrypted data) in the storage device included in the auxiliary storage unit 13 in a state where the certification data can be correlated with the user identifier obtained in ACT 21. Thus, by the processor 11 executing the information processing of the receipt server app APA, a computer including the processor 11 functions as a storage unit. In addition, in ACT 21, the processor 11 acquires a user identifier for identifying the user who requests data storage.

As described above, a purchaser who wants to check a transaction certificate registered in the certificate database DBB simply instructs the purchaser terminal 3 to display the certificate.

In the purchaser terminal 3, the processor 31 requests the certificate from the receipt server 1 in response to the user instruction. For example, the processor 31 transmits request data identifying the certificate request to the receipt server 1 from the mobile communication unit 36 via the communication network 5.

When the request data is transmitted to the receipt server via the communication network 5 and is received by the communication unit 14, the processor 11 determines YES in ACT 25 and proceeds to ACT 29.

In ACT 29, the processor 11 generates a list screen file and transmits the list screen file to the purchaser terminal 3 as the request source. For example, the processor 11 searches the certificate database DBB for the data record DRB in which the user identifier of the user authenticated in ACT 21 is stored in the field FBA. The processor 11 generates the list screen file as a data file representing a list screen of commodity names in the respective fields FCC of each of the certification data groups stored the data record DRB. The processor 11 transmits the list screen file from the communication unit 14 to the purchaser terminal 3 via the communication network 5.

When the list screen file is transmitted to the purchaser terminal 3 via the communication network 5 and is received by the mobile communication unit 36, the processor 11 in the purchaser terminal 3 causes the touch panel 34 to display a list screen represented by the list screen file. The purchaser selects a commodity for which a certificate is desired to be checked from the list screen and designates the corresponding commodity through a predetermined operation on the touch panel 34, for example. The processor 31 notifies the receipt server 1 of the designated commodity in response to the operation. For example, the processor 11 transmits notification data, which includes identification data for identifying the designated commodity notification and a commodity code of the designated commodity, from the mobile communication unit 36 to the receipt server 1 via the communication network 5.

When the transmission of the list screen file is ended, the processor 11 in the receipt server 1 proceeds to ACT 30.

In ACT 30, the processor 11 waits for designation of a commodity. When the notification data is transmitted to the receipt server 1 via the communication network 5 and then received by the communication unit 14, the processor 11 determines YES and proceeds to ACT 31.

In ACT 31, the processor 11 generates a certificate image. The certificate image is an image for certifying a transaction of the designated commodity. For example, the processor 11 searches the data record DRB found in ACT 29 for the certification data group in which the commodity code in the notification data is stored in the field FCA. The processor 11 generates a certificate image as an image representing a manufacturer name, a commodity name, a purchase date, and a shop name as stored in each of the fields FCB to the FCE of the corresponding certification data group.

Figure 11:
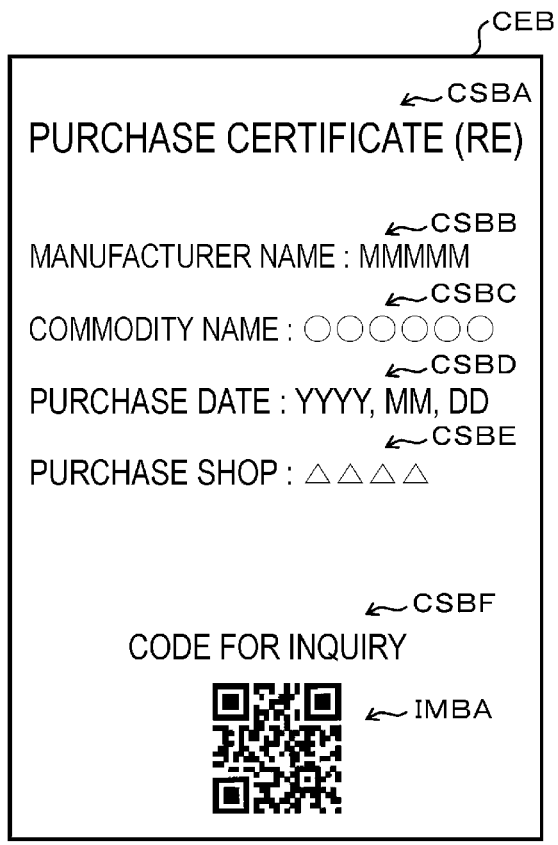
FIG. 11 depicts an example of a certificate image according to an embodiment.

FIG. 11 is a diagram illustrating an example of the certificate image.

A transaction certificate CEB illustrated in FIG. 11 includes character strings CSBA, CSBB, CSBC, CSBD, CSBE, and CSBF and an image IMBA.

The character string CSBA represents that the printed material is a certificate that certifies a transaction relating to the sales of a commodity relating to the contents represented by the character strings CSBB, CSBC, CSBD, and CSBE. In the example illustrated in FIG. 11, the certificate is used to certify the purchase of the commodity by the purchaser actually occurred, and thus in the character string CSBA, "purchase certificate" is written. In addition, the character string CSBA includes "(RE)" so as to indicate that the certificate has been reprinted. The character string CSBB represents a name of a manufacturer of the target commodity. The character string CSBC represents a commodity name of the target commodity. The character string CSBD represents a transaction date. The character string CSBE represents a name of a shop where the transaction was executed. The character string CSBF indicates that the image IMBA is a two-dimensional code representing encrypted data. The processor 11 generates the image IMBA obtained by converting the encrypted data, which was obtained by encrypting the certification data with the private key KPR, into a two-dimensional code based on a predetermined protocol.

In ACT 32, the processor 11 transmits image data representing the certificate image from the communication unit 14 to the purchaser terminal 3 as the request source via the communication network 5. When the transmitting of the image data is ended, the processor 11 ends the service provision process.

When the image data is transmitted to the purchaser terminal 3 via the communication network 5 and is received by the mobile communication unit 36 of the purchaser terminal 3, the processor 31 causes the touch panel 34 to display the certificate image representing the image data.

The purchaser checks the certificate image displayed by the touch panel 34 in the purchaser terminal 3, and when the purchaser confirms that the certificate relates to the commodity that is desired to be warranted, for example, the purchaser instructs printing through a predetermined operation on the touch panel 34. In response to the operation, the processor 31 transmits the certificate image to the printer 6 via the wireless communication unit 37 and instructs the printer 6 to print the certificate image. In response to the instruction, the printer 6 prints the certificate image on a sheet such as plain paper set in the printer 6. The printer 6 discharges the printed sheet as a transaction certificate corresponding to the certificate image.

The purchaser certifies the right for the warranty service or the like for the commodity by adding the transaction certificate CEB printed by the printer 6 to the warranty information of the commodity and presenting the warranty information to an employee of the repair provider. The employee is, for example, a person in charge of a maintenance counter or an on-site repair worker.

When it is necessary to check the content of the transaction certificate CEB, the employee instructs the provider terminal 4 to start information processing using the browser app APE.

The processor 41 in the provider terminal 4 starts information processing based on the browser app APE in response to the instruction. The processor 41 requests the receipt server 1 to authenticate the user. For example, the processor 41 transmits request data that includes identification data for identifying the user authentication request and the user identifier and the password. The request data is transmitted from the mobile communication unit 36 to the receipt server 1 via the communication network 5. The processor 41 may cause the request data to include a user identifier and a password that has been stored in the main memory 42 or the auxiliary storage unit 43 in advance. Otherwise, when the employee designates a user identifier and a password, the processor 41 may cause the request data to include the designated user identifier and the designated password. In this context, user identifier is assigned to the provider, and a type code representing the provider is set in the field FAC of the data record DRA with the user identifier is in the field FAA of the user database DBA.

When the request data is transmitted to the receipt server 1 via the communication network 5 and is then received by the communication unit 14, the processor 11 starts the service provision process using the receipt server app APA. If the authentication is successful (YES in in ACT 21), the processor 11 proceeds to ACT 23. If the authentication is unsuccessful (NO in ACT 21), processing ends. In ACT 23, processor 11 determines whether the user is a purchaser or not based on the type code. If the user is not a purchaser (NO in ACT 23), the process proceeds to ACT 33. If the user is a purchaser (YES in ACT 23), the process proceeds to ACT 24, as discussed above.

In ACT 33, the processor 11 transmits an inquiry page file representing an inquiry page to the provider terminal 4. The inquiry page is a web page for making an inquiry about a transaction certificate CEB. For example, the processor 11 transmits the inquiry page file that has been prepared in advance from the communication unit 14 to the provider terminal 4 via the communication network 5.

In ACT 34, the processor 11 waits for a certification inquiry.

After the inquiry page file is transmitted to the provider terminal 4, the processor 41 causes the display unit 44 to display the inquiry page based on the inquiry page file.

The employee may then cause the scanner 46 to scan the image IMBA shown in the transaction certificate CEB to make an inquiry in accordance with the inquiry screen displayed by the display unit 44 in the provider terminal 4. The scanner 46 optically scans a two-dimensional code represented by the image IMBA and transmits the data represented by the two-dimensional code (hereinafter, referred to as "two-dimensional code data") to the processor 41. The processor 41 generates inquiry data including the two-dimensional code data in accordance with control data included in the inquiry page, and then transmits the inquiry data from the communication unit 47 to the receipt server 1 via the communication network 5.

In the provider terminal 4, the encrypted data is read by decoding the two-dimensional code represented by the image IMBA. That is, the transmission of the transaction certificate CEB including the image IMBA to the purchaser terminal 3 corresponds to the transmission of the encrypted data to the purchaser terminal 3 such that the encrypted data is output to the provider terminal 4. Thus, by the processor 11 executing the information processing based on the receipt server app APA, a computer including the processor 11 functions as the transmission unit. Here, the transmitted encrypted data is obtained by encrypting the certification data that is stored in the auxiliary storage unit 13 correlated to the user identifier acquired in ACT 21.

When the inquiry data is received by the communication unit 14, the processor 11 determines YES in ACT 34 and proceeds to ACT 35. At this time, the processor 11 causes the main memory 12 or the auxiliary storage unit 13 to store the inquiry data. Thus, by the processor 11 executing the information processing based on the receipt server app APA, a computer including the processor 11 acquires the encrypted data from the provider terminal 4.

In ACT 35, the processor 11 executes a decryption process. For example, the processor 11 extracts the encrypted data from the two-dimensional code data in the inquiry data and decrypts the encrypted data using the public key KPU.

In ACT 36, the processor 11 transmits check screen data. For example, the processor 11 generates a check screen showing the decrypted certification data and then transmits check screen data to the provider terminal 4 via the communication network 5. Next, the processor 11 ends the service provision process.

Figure 12:
FIG. 12 depicts an example of a check screen.

FIG. 12 is a diagram illustrating an example of the check screen.

A check screen SCA in FIG. 12 includes character strings CSCA, CSCB, CSCC, CSCD, and CSCE.

The character string CSCA is a character message representing that the transaction certificate CEB to be inquired is a certificate that certifies transaction relating to the sales of a commodity relating to the contents represented by the character strings CSBB, CSBC, CSBD, and CSBE. The character string CSCB represents a name of a manufacture of the commodity in the transaction to be certified by the transaction certificate CEB. The character string CSCC represents a commodity name of the commodity in the transaction to be certified by the transaction certificate CEB. The character string CSCD represents a transaction date of the transaction to be certified by the transaction certificate CEB. The character string CSCE represents a name of a shop where transaction to be certified by the transaction certificate CEB occurred.

When the check screen data is transmitted to the provider terminal 4 via the communication network 5 and is received by the communication unit 47 of the provider terminal 4, The processor 41 causes the display unit 44 to display the check screen SCA based on the check screen data, for example, as a pop-up window.

Thus, by transmitting the check screen data, the processor 11 instructs the provider terminal 4 to output the check screen SCA as a screen indicating the certification data. That is, by the processor 11 executing the information processing of the receipt server app APA, a computer including the processor 11 functions as the instruction unit.

The public key KPU may be open to the provider, and the processor 41 in the provider terminal 4 may decrypt the encrypted data in the image IMBA and generate the check screen SCA.

The employee can check the validity of the transaction certificate CEB by comparing the check screen SCA displayed by the display unit 44 in the provider terminal 4 to the features described in the transaction certificate CEB. That is, since the transaction certificate CEB is printed by the purchaser, the risk of falsification of the character strings CSBB, CSBC, CSBD, and CSBE is potentially high. However, the two-dimensional code represented by the image IMBA represents the encrypted data obtained by encrypting the certification data using the private key KPR. Therefore, it is difficult to counterfeit an image IMBA to correspond to the certification data. Thus, if the character strings CSBB, CSBC, CSBD, and CSBE are falsified, then information represented by the character strings CSBB, CSBC, CSBD, and CSBE will not match information represented by the character strings CSCB, CSCC, CSCD, and CSCE on the check screen SCA.

If the employee is instructed to check the check screen SCA each time, then the employee does not need to directly check features in the transaction certificate CEB itself. Therefore, in this case, the transaction certificate CEB only needs to include the image IMBA, and some or all of the character strings may be omitted.

As described above, in the transaction certification system 100, in response to the request of the purchaser who acquires the transaction certificate CEA dispensed by the transaction processing apparatus 2, the certification data (representing the content of certification in the transaction certificate CEA) is managed by the receipt server 1 in a state in which the certification data correlates with the user identifier for identifying the purchaser as the request source. In the transaction certification system 100, the transaction certificate CEB representing the certification data that is managed in correlation with the user identifier of the purchaser can be printed by the purchaser terminal 3 in response to a request by the purchaser. Thus, the purchaser can certify the content of a transaction which the purchaser made in the past without keeping the transaction certificate CEA, and the burden on the purchaser regarding the certification can be reduced.

In addition, in the transaction certification system 100, the encrypted data obtained by encrypting the certification data is represented in the transaction certificate CEA, the encrypted data is transmitted from the purchaser terminal 3 to the receipt server 1, and the certification data obtained by decrypting the encrypted data is managed by the receipt server 1. Therefore, the certification data managed by the receipt server 1 is not likely to be falsified by the purchaser.

In addition, in the transaction certification system 100, the encrypted data obtained by encrypting the certification data is represented in the transaction certificate CEB, the encrypted data is read by the provider terminal 4 and transmitted to the receipt server 1, and the certification data obtained by decrypting the encrypted data is displayed by the provider terminal 4. Alternatively, the certification data obtained by decrypting the encrypted data in the provider terminal 4 can be displayed by the provider terminal 4. As a result, the validity of the transaction certificate CEB can be checked by the employee of the repair provider.

By using the encrypted data as described above, illegal falsification of the transaction certificates CEA and CEB by a purchaser can be prevented.

This embodiment can be modified as follows in various ways.

In ACT 31 of FIG. 10, the processor 11 may encrypt the certification data with a public key KPU. In this case, the processor 11 uses a private key KPR for the decryption process in ACT 35. If omitting ACT 27, the processor 11 may cause the data record DRB of the certificate database DBB to include the encrypted data instead of decrypted certification data in the request data and a two-dimensional code can be generated directly from the encrypted data in ACT 31 rather than after a decryption process.

For encryption and decryption of the encrypted data in the image IMAB illustrated in FIG. 9 and the encrypted data in the image IMBA illustrated in FIG. 11, different pairs of public keys and private keys may be used.

The employee may check the transaction certificate CEB displayed on the touch panel 34 of the purchaser terminal 3. The employee may cause the scanner 46 to read the image IMBA displayed on the touch panel 34 of the purchaser terminal 3.

As a purchaser terminal 3, a stationary computer apparatus that is provided at the home of the purchaser may be used.

The purchaser terminal 3 may implement a user interface for using the transaction certification service via a general-purpose web browser or the like.

A plurality of terminal apparatuses may be used as the purchaser terminal 3 by the same purchaser. For example, the certification may be registered by using a smartphone as the purchaser terminal 3 in one instance, and then the certificate may be acquired by using a home computer apparatus as the purchaser terminal 3 in another instance. That is, the purchaser terminal 3 can be any terminal apparatus that requests the receipt server 1 to execute authentication using the user identifier assigned to the purchaser.

The provider terminal 4 may implement a user interface for using the transaction certification service through information processing of the processor 41 based on a dedicated application program.

A plurality of terminal apparatuses may be used as the provider terminal 4 by the same provider. For example, a terminal apparatus that is used by a field worker belonging to a certain provider and a terminal apparatus that is used by a person in charge of a maintenance reception counter of the same provider may be respectively used. That is, the provider terminal 4 is an information terminal that requests the receipt server 1 to execute authentication using the user identifier assigned to the provider.

The transaction certification service may be provided irrespective of the electronic receipt service. In this case, in the receipt server 1, information processing for the transaction certification service may be executed separately from information processing for providing the electronic receipt service, or information processing for the transaction certification service may be executed using another information processing apparatus that does not execute information processing for providing the electronic receipt service. In this case, as the user identifier, an identifier for the electronic receipt service may be used, or another identifier different from that for the electronic receipt service may be used.

As long as the image for allowing the purchaser terminal 3 to read the encrypted data is optically readable, the image may be, for example, a code symbol or a character string other than a two-dimensional code. In addition, the purchaser terminal 3 may acquire the encrypted data from the purchaser terminal 3 via communication.

As long as the image for allowing the provider terminal 4 to read the encrypted data is optically readable, the image may be, for example, a code symbol or a character string other than a two-dimensional code. In addition, the provider terminal 4 may acquire the encrypted data from the purchaser terminal 3 via communication.

The transaction to be certified is not limited to the sales of a commodity and may relate to provision of food and drink to be immediately consumed (e.g., restaurant service) or provision of an intangible service or the like. Similarly, the transaction may or may not involve monetary payment for settlement.

A part or all of the respective functions that are implemented by the processor 11, 21, 31, or 41 performing information processing (according to a program or software) can also or instead be implemented by hardware, such as a logic circuit, which executes the information processing not based on a software program or the like. In addition, the various functions can also be implemented by a combination of hardware (such as a logic circuit) and execution of software control programs or the like.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such embodiments or modifications as would fall within the scope and spirit of the invention.

What is claimed is:

1. A transaction certification system, comprising:
   a transaction processing apparatus configured to output encrypted data including transaction certification data for certification of a transaction executed on the transaction processing apparatus; and
   a server configured to:
      receive the encrypted data from a first terminal apparatus configured to read the encrypted data output by the transaction processing apparatus,
      acquire a first user identifier identifying a user of the first terminal apparatus sending the encrypted data,
      store the transaction certification data of the encrypted data in a storage device, the transaction certification data being correlated to the acquired user identifier,
      receive a second user identifier for a user requesting a transaction certification, and
      transmit the transaction certification data to a second terminal apparatus associated with the second user identifier.

2. The transaction certification system according to claim 1, wherein the transaction certification data is stored as encrypted data as received from the first user terminal.

3. The transaction certification system according to claim 1, wherein
   the server is configured to decrypt the encrypted data, and
   transaction certification data is stored as decrypted data after decryption of the encrypted data received from the first terminal.

4. The transaction certification system according to claim 1, wherein the first user identifier and the second user identifier are the same user identifier.

5. The transaction certification system according to claim 1, wherein the first user identifier and the second user identifier are different user identifiers.

6. The transaction certification system according to claim 5, wherein the server is further configured to:
   acquire encrypted data from the second terminal apparatus, and cause the second terminal apparatus to display a screen showing transaction certification data obtained by decrypting the encrypted data from the second terminal apparatus.

7. The transaction certification system according to claim 1, wherein the transaction processing apparatus outputs the encrypted data as a two-dimensional code.

8. The transaction certification system according to claim 1, wherein the transaction processing apparatus is configured to output the encrypted data as a two-dimensional code printed on paper.

9. The transaction certification system according to claim 1, wherein the transaction processing apparatus is configured to output the encrypted data as a two-dimensional code on a display screen.

10. The transaction certification system according to claim 1, wherein the server transmits the transaction certification data as image data corresponding to a two-dimensional code encoding the transaction certification data.

11. A transaction certification management apparatus, comprising:
   a communication interface configured to send and receive data over a communication network;
   a storage device configured to store data;
   a processor configured to:
      receive encrypted data via the communication interface from a first terminal apparatus, the encrypted data including transaction certification data generated and output by a transaction processing apparatus, the first terminal apparatus being configured to read the encrypted data output by the transaction processing apparatus,
      acquire a first user identifier identifying a user of the first terminal apparatus sending the encrypted data,
      store the transaction certification data of the encrypted data in the storage device, the transaction certification data being correlated to the acquired user identifier,
      receive, via the communication interface, a second user identifier for a user requesting a transaction certification, and
      transmit the transaction certification data to a second terminal apparatus associated with the second user identifier.

12. The transaction certification management apparatus according to claim 11, wherein the server is configured to decrypt the encrypted data.

13. The transaction certification management apparatus according to claim 11, wherein the first user identifier and the second user identifier are different user identifiers.

14. The transaction certification management apparatus according to claim 13, wherein the processor is further configured to:

acquire encrypted data, via the communication interface, from the second terminal apparatus, and
cause the second terminal apparatus to display a screen showing transaction certification data obtained by decrypting the encrypted data from the second terminal apparatus.

15. The transaction certification management apparatus according to claim 11, wherein the processor is configured to transmit, via the communication interface, the transaction certification data as image data corresponding to a two-dimensional code encoding the transaction certification data.

16. A transaction certification processing method, comprising:
   receiving encrypted data via a communication interface from a first terminal apparatus, the encrypted data including transaction certification data generated and output by a transaction processing apparatus, the first terminal apparatus being configured to read the encrypted data output by the transaction processing apparatus;
   acquiring a first user identifier identifying a user of the first terminal apparatus sending the encrypted data;
   storing the transaction certification data of the encrypted data in a storage device, the transaction certification data being correlated to the acquired user identifier;
   receiving, via the communication interface, a second user identifier for a user requesting a transaction certification; and
   transmitting the transaction certification data to a second terminal apparatus associated with the second user identifier.

17. The transaction certification processing method according to claim 16, wherein the first user identifier and the second user identifier are the same.

18. The transaction certification processing method according to claim 16, wherein the first user identifier and the second user identifier are different user identifiers.

19. The transaction certification processing method according to claim 18, further comprising:
   acquiring encrypted data, via the communication interface, from the second terminal apparatus; and
   causing the second terminal apparatus to display a screen showing transaction certification data obtained by decrypting the encrypted data from the second terminal apparatus.

20. The transaction certification processing method according to claim 16, further comprising:
   transmitting, via the communication interface, the transaction certification data as image data corresponding to a two-dimensional code encoding the transaction certification data.

* * * * *